United States Patent [19]
Padden

[11] Patent Number: 5,500,272
[45] Date of Patent: Mar. 19, 1996

[54] HIGH EFFICIENCY LOAD TRANSFER IN COMPOSITE STRUCTURE

[75] Inventor: Vincent T. Padden, Brightwaters, N.Y.

[73] Assignee: Northrop Grumman Corporation, Los Angeles, Calif.

[21] Appl. No.: 371,432

[22] Filed: Jan. 11, 1995

[51] Int. Cl.⁶ ........................................................ B32B 3/24
[52] U.S. Cl. ............................ 428/140; 428/139; 428/137
[58] Field of Search ..................................... 428/137, 139, 428/140

[56] References Cited

U.S. PATENT DOCUMENTS

| | | | |
|---|---|---|---|
| 3,711,934 | 1/1973 | Zorowski et al. | 156/163 |
| 4,229,473 | 10/1980 | Elber | 428/140 |

Primary Examiner—William P. Watkins, III

Attorney, Agent, or Firm—Terry J. Anderson; Karl J. Hoch, Jr.

[57] ABSTRACT

Thin perforated sheets of titanium are interleaved between adjacently situated graphite/epoxy plies—in the area where metal fittings are to be installed. Epoxy flows through these perforations so as to achieve a gripping mechanism between the titanium sheet and the graphite/epoxy plies. The result is efficient transfer of load in the titanium to the composite fiber materials without suffering the cost penalty of extensive graphite/epoxy buildups (without interleaved titanium sheets). Epoxy plugs within the titanium sheet perforations bond to confronting surfaces of the graphite/epoxy plies and provide a fail safe gripping mechanism between the titanium sheet and adjacent graphite/epoxy plies to allow for the load transfer between the titanium sheet and the graphite/epoxy plies in the unlikely event that the shear bond between the faces of the titanium sheet and the graphite/epoxy plies becomes completely disbonded.

1 Claim, 3 Drawing Sheets

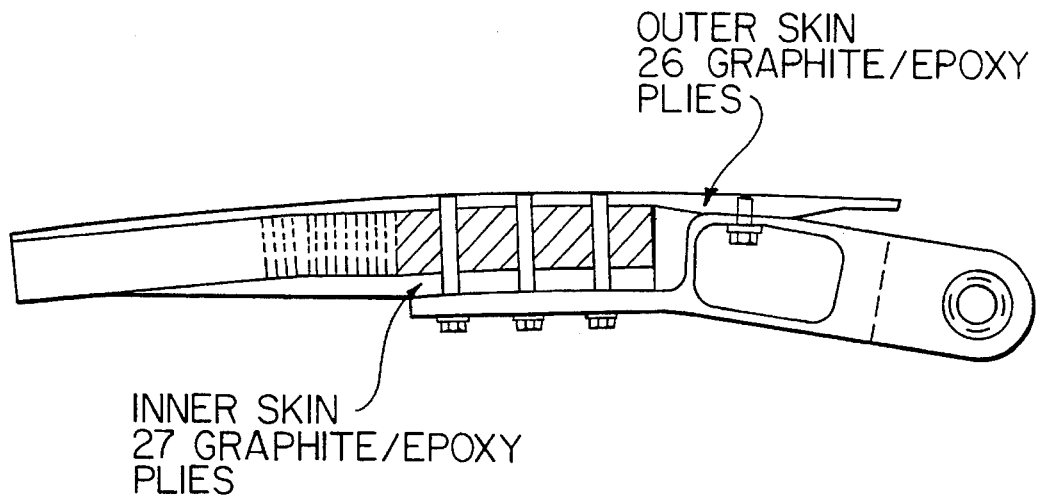
FIG. 4A
FIG. 4B
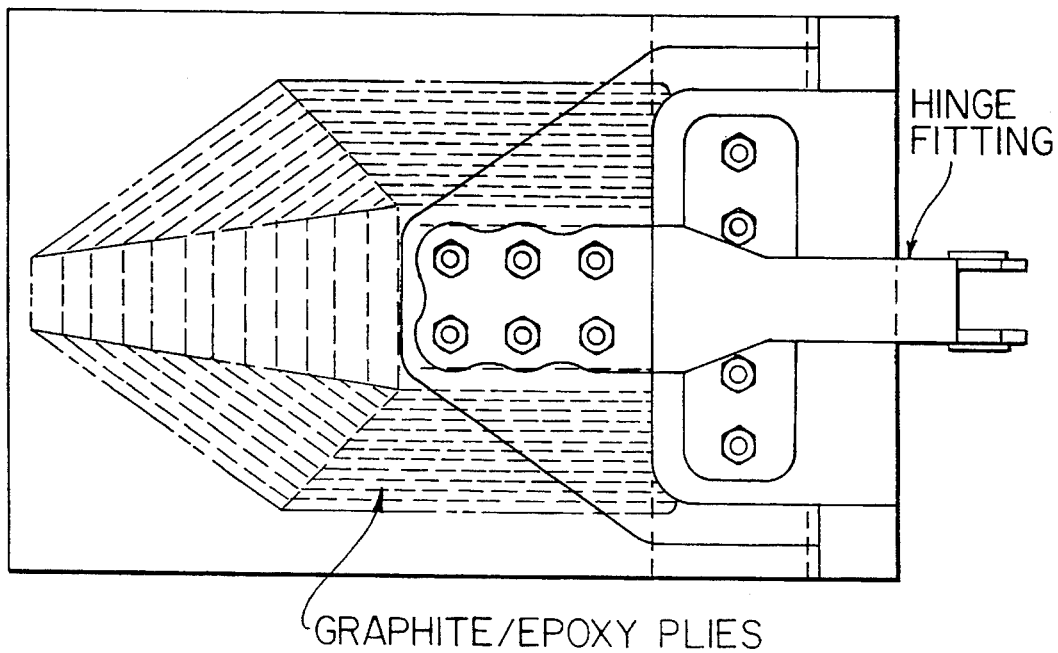

HIGH EFFICIENCY LOAD TRANSFER IN COMPOSITE STRUCTURE

FIELD OF THE INVENTION

The present invention relates to the construction of advanced composite structures, such as graphite/epoxy, and more particularly to a laminated composite structure for facilitating load transfer from installed fittings.

BACKGROUND OF THE INVENTION

Advanced composite structures are becoming more widely used in the aircraft industry. Utilization of composites can result in substantial weight savings. However, it is often necessary to install metal fittings, such as hinges, into such structures to facilitate the introduction of loads. In areas where such fittings are installed, it is necessary to add additional material thickness in the composite structure in order to provide sufficient bearing area for the fasteners attaching the fitting to the laminates. For example, in a typical composite honeycomb structure using graphite epoxy material, the number of plies in the area of a hinge fitting may be 27 for an inner skin and 24 plies for an outer skin while the greater area of the panel away from the fitting consists of three inner skin plies and three outer skin plies. The creation of a lay up having this number of plies is quite time consuming which translates to increased costs. Further, the increased number of plies in the area of a metal fitting detracts from the purpose of utilizing composites—namely weight savings while adding cost.

BRIEF DESCRIPTION OF THE PRESENT INVENTION

The present invention is intended to reduce the number of plies which must be present in the vicinity of an installed metal fitting yet provide sufficient bearing area for a fastener attaching the fitting to the inner and outer laminates of a bonded panel.

This is achieved by interleafing thin titanium sheets between graphite/epoxy plies. The titanium sheet has holes fabricated therein to allow pass through of epoxy resin between adjacently situated graphite/epoxy plies, which are separated by the correspondingly positioned titanium sheet. In effect, the use of thin titanium sheets to replace the non-metallic fiber plies in the fitting areas of a composite lay up in structures, saves cost and weight by reducing the number of graphite plies.

Essentially, the holes allow the footprint of a thin titanium sheet to be present over an area sufficient in size to allow for efficient transfer of the load in the titanium to the composite fiber material. Further, the resin plugs formed in the holes provide a "fail safe" gripping mechanism between the titanium sheet and adjacent composite plies in order to allow for load transfer between the titanium sheet and the composite matrix plies in the unlikely event that the shear bond between the faces of the titanium sheet and the adjacent composite matrix plies becomes completely disbonded.

BRIEF DESCRIPTION OF THE FIGURES

The above-mentioned objects and advantages of the present invention will be more clearly understood when considered in conjunction with the accompanying drawings, in which:

FIG. 4A and FIG. 4B are views of a method of attaching a hinge fitting to a graphite/epoxy laminated structure.

DETAILED DESCRIPTION OF THE INVENTION

Figure 1:
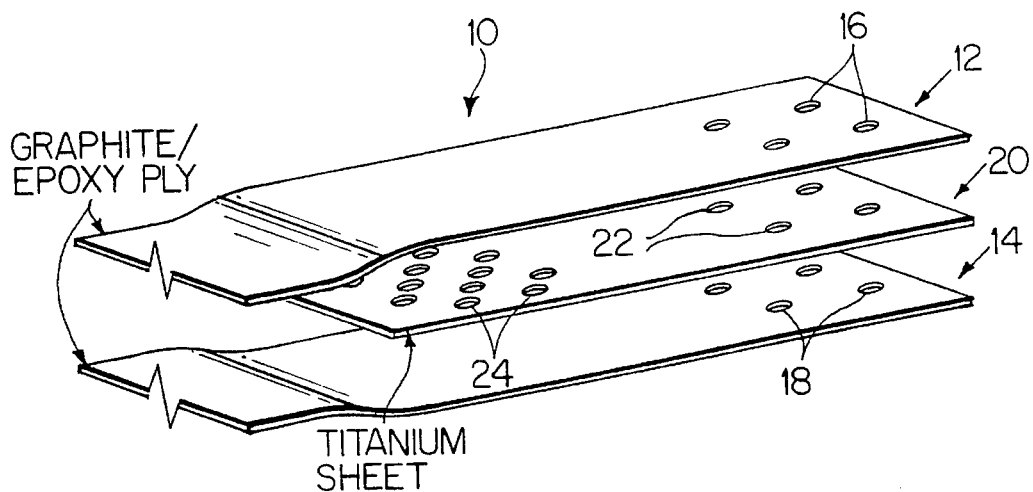
FIG. 1 is a disassembled view of a simplified structure in accordance with the present invention.
Figure 2:
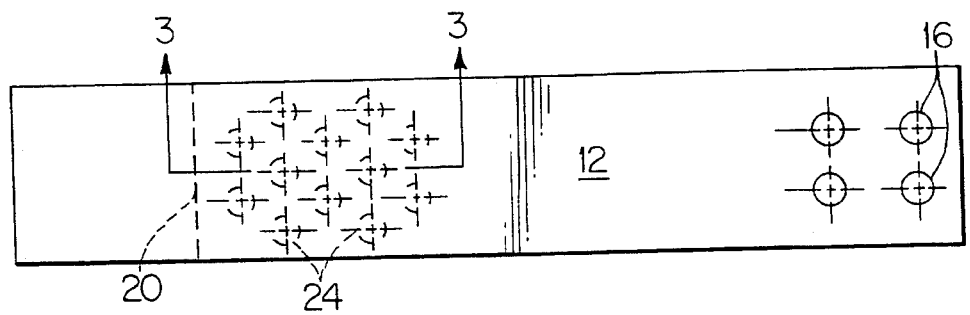
FIG. 2 is a top plan view of the structure shown in FIG. 1.

FIG. 1 illustrates the basic concept of the present invention utilizing a laminated structure which will accommodate a metal fitting (not shown). However, it is to be understood that the laminate would be repeated, in an actual utilization of the invention, so as to provide sufficient bearing strength for an installed fitting. Spaced graphite/epoxy plies 12 and 14 are of a conventional prepreg nature wherein the graphite fiber is impregnated with epoxy material. Interleaved between the plies 12 and 14 is a thin titanium sheet, typically having a thickness of 0.016 inches. The graphite/epoxy plies 12 and 14 have aligned holes 16, 18 for accommodating a typical fixture thereon. In order to allow fitting fasteners through all plies, holes 22 are formed in the titanium sheet 20 and are aligned with the holes 16, 18 in the adjacent graphite/epoxy plies.

Figure 3:
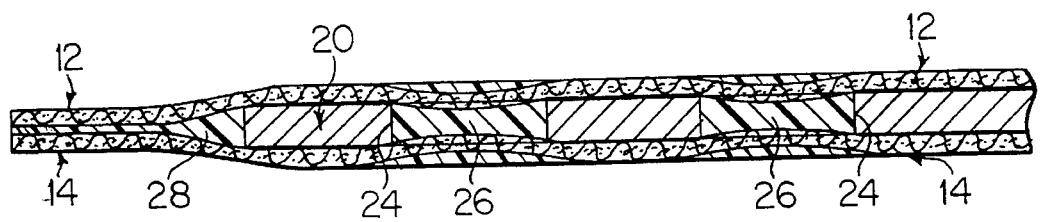
FIG. 3 is a cross sectional view of the structure shown in FIG. 1, taken along section line 3—3 of FIG. 2.

In order to achieve the benefits of the present invention, a series of perforations or holes 24 must be made on an opposite end of the titanium sheet 20. These holes allow the flow of epoxy material therethrough so as to contact confronting surfaces of the graphite/epoxy plies 12 and 14—clearly illustrated in the cross sectional view of FIG. 3. In the cross sectional view of FIG. 3, the epoxy/plugs 26 fill the holes 24 and contact the confronting surfaces of the graphite/epoxy plies 12 and 14. Of course, the epoxy material flows between the remaining confronting graphite/epoxy surface areas, as indicated by reference numeral 28, so as to bond these graphite/epoxy plies together in areas away from the interleaved titanium sheet. This will occur in areas outside the immediate installation of a fitting.

In essence, the epoxy filled holes in the titanium sheet produce gripping strength between the titanium and graphite/epoxy plies. This gripping mechanism solves two primary problems:

(1) the holes in the titanium sheet allow the footprint of the thin titanium sheet to be over an area sufficient in size to allow for the efficient transfer of load in the titanium to the composite fiber material of the graphite/epoxy plies without causing a weight penalty, i.e., the holes in the titanium reduce the size necessary (effective density) of the titanium sheet.

(2) the perforation size and quantity of the holes are selected to provide a "fail safe" gripping mechanism between the titanium sheet and the adjacent composite plies in order to allow for the load transfer between the titanium sheet and the composite matrix graphite/epoxy plies in the unlikely event that shear bond between the confronting faces of the titanium sheet and the composite matrix plies is completely disbonded.

As will be appreciated from the above discussion of the invention, a reduction of cost/weight is achieved when attaching metallic fittings to advanced composite structures. As a by-product, the number of attachment fasteners, the pitch between fasteners and the size of the attachment fitting footprint with the laminate is reduced, saving cost and weight.

The following example will illustrate the reduction in the number of graphite/epoxy plies required when the present invention is utilized.

Figure 5A:
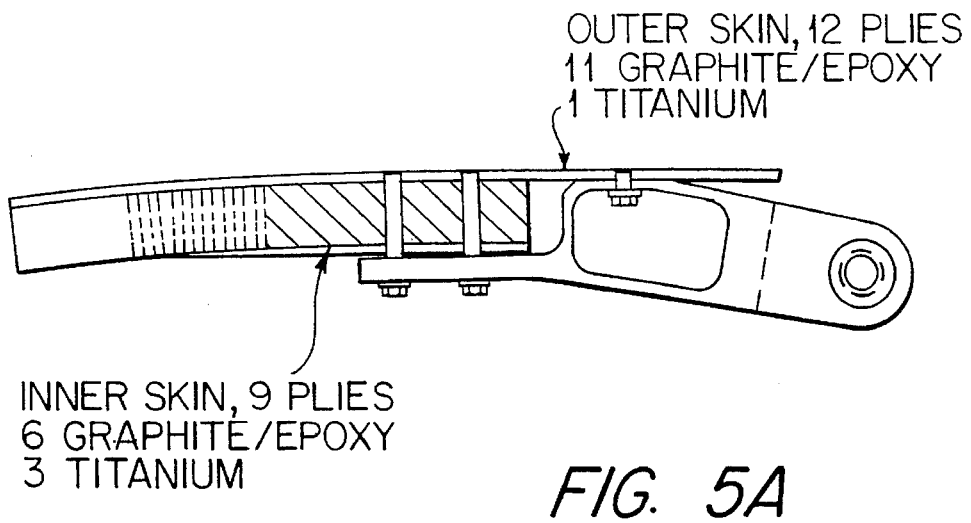
FIG. 5A and FIG. 5B are views of attaching a hinge fitting to a bonded panel with interleaved titanium sheets.
Figure 5B:
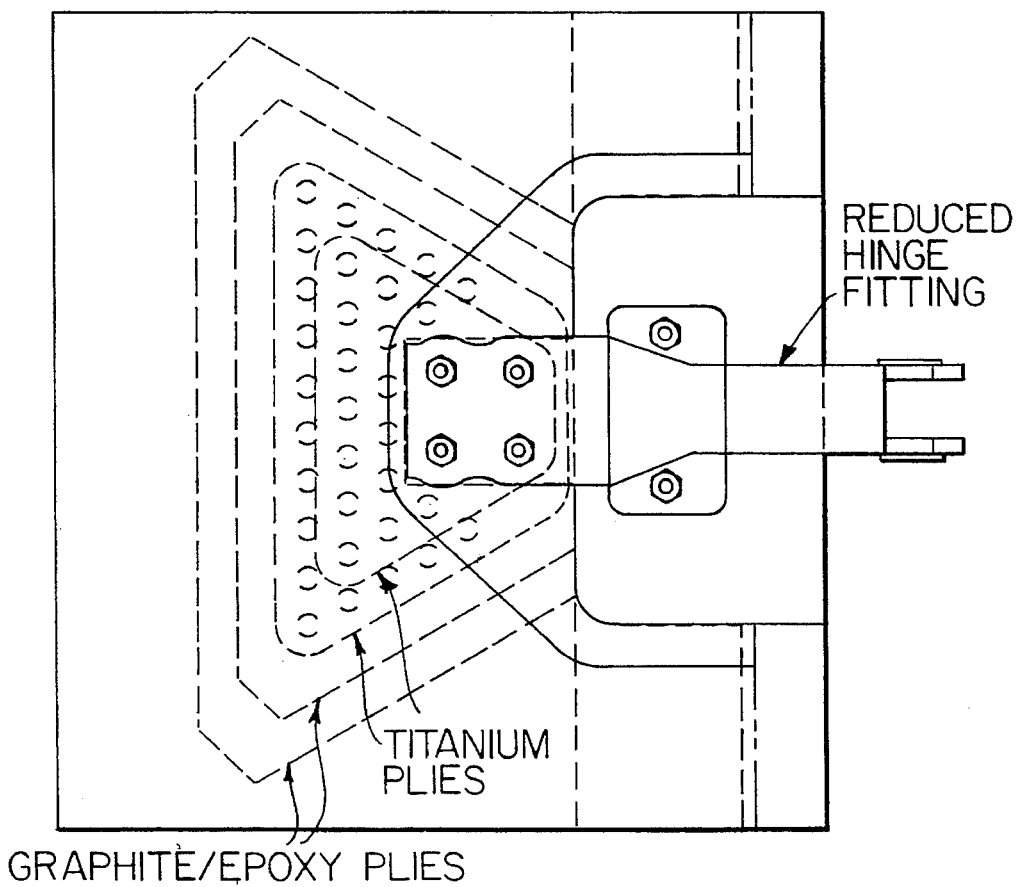

In a standard method of attaching a hinge fitting to a graphite/epoxy laminated structure shown in FIG. 4, the number of plies in the area of the fitting may be 27 for an inner skin and 24 for an outer skin. By utilizing the interleaved titanium sheets in accordance with the present invention, this number may be drastically reduced. For example, as shown in FIG. 5, the same bearing area for the fastener attaching a fitting to the inner and outer laminates of a bonded panel will be achieved by including 3 interleaved titanium sheets between 6 plies of graphite—in an inner skin; and a single titanium sheet interleaved between 11 graphite/epoxy plies—in an outer skin.

I claim:

1. A composite laminated panel having interleaved thin metallic sheets, comprising:

a plurality of spaced overlying plies of non-metallic woven composite material impregnated with epoxy material and forming the outer surfaces of the panel;

at least one sheet of thin metal interleaved between two adjacent plies;

a first series of aligned holes passing through the plies of the sheet for mounting fasteners of a fitting therethrough;

a second series of holes formed in the sheet only;

the epoxy material bonding together confronting surfaces of each ply and the sheet;

at least one edge portion of bonded overlying plies extending beyond the metal sheet;

each of the second series of holes receiving the bonding material to form plugs which grip the plies and the metal sheet thereby facilitating load transfer from the plies to the sheet, in the event of a total delamination between the plies and the adjacent metal sheet.

\* \* \* \* \*